June 10, 1930.  J. W. LEGG  1,763,242
OSCILLOGRAPH GALVANOMETER
Original Filed Nov. 26, 1924
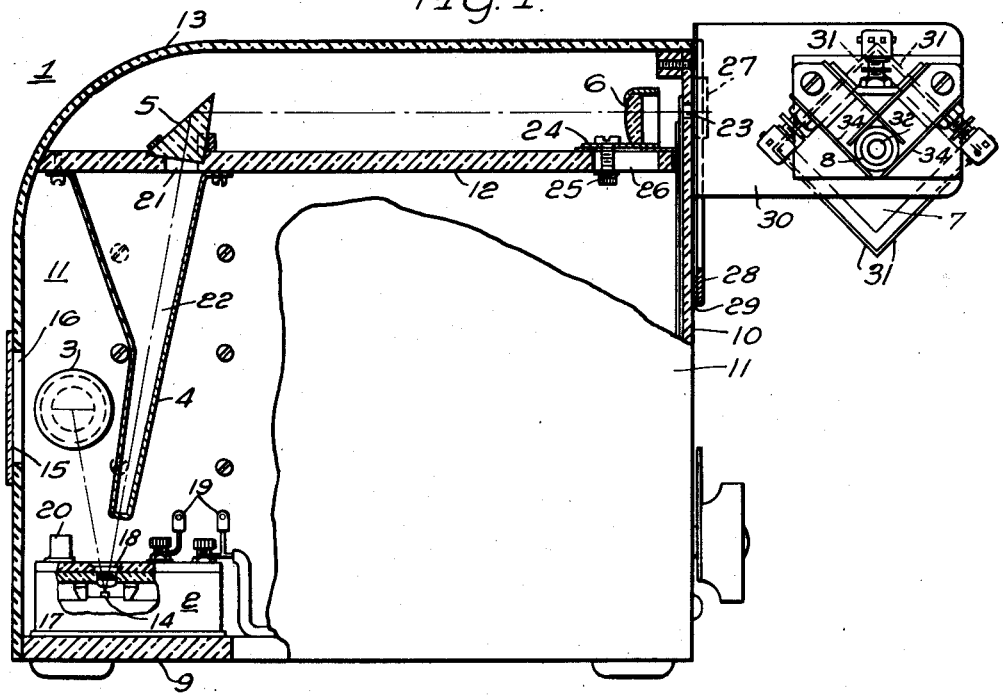
INVENTOR
Joseph W. Legg.
BY
Wesley G. Carr
ATTORNEY Patented June 10, 1930

1,763,242

UNITED STATES PATENT OFFICE

JOSEPH W. LEGG, OF WILKINSBURG, PENNSYLVANIA, ASSIGNOR TO WESTINGHOUSE ELECTRIC & MANUFACTURING COMPANY, A CORPORATION OF PENNSYLVANIA

OSCILLOGRAPH GALVANOMETER

Original application filed November 26, 1924, Serial No. 752,427. Divided and this application filed September 13, 1928. Serial No. 305,857.

My invention relates to oscillographs or oscilloscopes and particularly to those of the portable type in which the characteristic of an electrical quantity may be observed by viewing an effect produced by the vibrations of the deflecting system of the instrument as the quantity is impressed upon it.

An object of my invention is to provide a device of the above-mentioned character that shall employ a single galvanometer element and means whereby the same may give apparently simultaneous indications of conditions in different circuits or of different conditions in the same circuit.

Another object of my invention is to reduce the size and weight of a portable oscillograph or oscilloscope and to render the same simple, compact and durable in construction, economical to manufacture and effective in operation.

Heretofore, in oscillographs or oscilloscopes in which photographic charts or polygons of mirrors have been employed for obtaining curves of the instantaneous values of the voltage, current and other characteristics of electric circuits, it has been usual to employ a number of galvanometer elements corresponding to the number of circuits or characteristics to be simultaneously studied. This practice naturally resulted in the production and use of instruments of relatively large size and cost.

In practicing my invention, I provide a galvanometer element, a polygon of viewing mirrors and a switching means for so rapidly changing the galvanometer element from one circuit to another that the persistency of human vision causes the elements to appear to give simultaneous indications of the quantity being measured in each circuit.

This application is a division of my co-pending application Serial No. 752,427 filed November 26, 1924.

Other features and advantages of my invention will appear from the following description, taken in connection with the accompanying drawing, in which, Figure 1 is a view partly in side elevation, and partly in sections, of an oscillograph embodying my invention; and Fig. 2 is a circuit diagram of the electrical connections employed.

Referring to Fig. 1, the oscillograph comprises a casing 1, a galvanometer 2, a lamp 3, a light shield 4, a prism 5, a lens 6, a polygon of viewing mirrors 7 and a commutator 8.

The casing 1 is preferably constructed of a sheet-insulating material, such as fibrous material impregnated with a binder, and comprises a base plate 9, an end plate 10, side panels 11, a horizontal partition plate 12 and a single integral sheet 13 constituting the top and rear wall of the casing.

The top and rear wall portions of the casing are joined by a portion of gradual curvature for facility of manufacture, and are integral to make the casing light-tight and so prevent the reflection of stray beams of light from the galvanometer mirror 14. A removable cover member 15 is mounted over the opening 16 which permits an inspection of lamp 3.

The galvanometer 2, the detail construction of which is described in my co-pending application, Serial No. 757,586, filed December 23, 1924, comprises a fluid-tight casing 17, disposed in the lower rear portion of the casing 1 containing a horizontally disposed galvanometer mirror 14 arranged beneath the lens or window 18 in the upper wall portion of the galvanometer casing. Terminals 19 are provided for this galvanometer winding, and a structure 20 is provided for the purpose of admitting a fluid to the galvanometer casing and for adjusting the tension on the galvanometer element, as set forth in the co-pending application.

The lamp 3 is adjustably mounted on one of the side panels 11, and comprises an elongated filament constituting a linear light source for the galvanometer 2. The light shield 4, preferably constructed of relatively thin sheet aluminum, is of substantially funnel shape and rectangular in horizontal section. The shield is secured, at its larger end, to the horizontal partition 12 surrounding an opening 21 in the latter. The shield 4 affords a passage enclosing a portion of the light beam reflected from the mirror 14, as indicated by the broken line 22, and projects downwardly from the partition 12 so that the lower end thereof is just above the galvanometer 2 and beneath the lamp 3. This construction prevents stray light beams from the lamp from entering the passage defined by the shield 4.

The prism 5 secured in position on the partition 12 over the opening 21 directs the beam from the mirror 14 through a semi-cylindrical lens 6 toward a slot 23 in the end plate 10.

The lens 6 is clamped to a member 24 that is adjustably mounted on the partition 12 by means of a screw 25 which extends through a slot 26 in the partition 12. This construction permits the beam to be properly focused, through the slot 23, upon a ground-glass screen 27 so that it can be viewed in the polygon of mirrors 7.

A member 28 of substantially U-shape, preferably constructed of sheet or strap material, is held in slightly-spaced parallel-plane relation to the outer surface of the end plate 10 by a spacer 29. The arrangement of parts permits the flanged plates 30, supporting the polygon of mirrors 7, to be slipped into position behind the member 28 to hold the mirrors in proper relation to the slot 23. The polygon-of-mirrors device comprises four mirrors 31 mounted on a shaft 32 which is journalled in the flanged plates 30, and which carries a pulley 33 on one end thereof and a commutator 8 on the other end. Brushes 34 are mounted on one of the flanged plates 30 so disposed that they cooperate with the commutator 8.

The polygon of mirrors 7 is rotated at a high rate of speed by a belt connecting the pulley 33 to a motor (not shown).

Referring to Fig. 2, it will be noted that the commutator 8 comprises an insulating segment 35 and a conducting segment 36 shaped to alternately shift the electrical connections of the galvanometer element 37 from one circuit to another. The middle brush 34 makes continuous contact with the conducting segment 36 while the outside brushes alternately make contact with the conducting segment. In this instance, which is merely illustrative of one of several sets of circuit shifts which may be effected, the commutator 8, when rotated, alternately shifts the connection of the galvanometer element 37 so that the element is energized, at one instant, in accordance with the current traversing a circuit 38 and is energized at the next instant in accordance with the voltage of the same circuit. The circuit is representative of a usual circuit comprising a generator 39, a current shunt 40 and a load device 41.

With the commutator in the position shown in Fig. 2, the galvanometer element 37 is connected across the circuit 38 through a conductor 42, resistor sections 43, a conductor 44, the right-hand brush 34, through the conducting segment 36, the middle brush, resistor sections 45 and the conductor 46. Thereafter, the galvanometer element 37 is connected across the current shunt 40 through the conductor 46, certain of the resistor sections 45, the middle brush, the conducting segment 36, the left hand brush and the conductor 47.

A resistor element 48 is connected from the right-hand brush to the upper terminal of the galvanometer element 37, so that when element 37 is energized, in accordance with the voltage of the circuit 38, a portion of the current will be shunted around the right-hand and middle brushes to prevent sparking of the commutator. In case the oscillograph is connected to a low-voltage circuit, there will be no danger of sparking of the commutator, and the connection from the right-hand brush to the galvanometer element, through the resistance 48, may be omitted.

The current through the galvanometer element may be adjusted variously, in accordance with the character of the circuit 38, by proper selection of the resistor sections 43 and 45. When the mirrors 31 and commutator 8 are rotated at, or above a certain speed, the galvanometer element 37 is shifted from one circuit to the other so rapidly that, because of the persistency of human vision, when one looks down upon the viewing mirrors the current and voltage waves of the circuit 38 appear to be simultaneously present and superimposed.

While the arrangement of parts contained in the casing 1 is the preferred form for use in connection with the above described circuit, many other arrangements may obviously be resorted to.

Various modifications may be made in my invention without departing from the spirit and scope thereof, and I desire, therefore, that only such limitations shall be placed therein as are shown by the prior art and set forth in the appended claims.

I claim as my invention:

1. The combination with a single electro-responsive indicating means and a plurality of circuits, of means for changing said indicating means from circuit to circuit and for causing the indicating means to effect apparently concurrent indications of quantities of said circuits.

2. The combination with a single electro-responsive indicating means and a plurality of circuits, of means for changing said indicating means from circuit to circuit and simultaneously adjusting said indicating means to the several circuits and for causing the indicating means to effect apparently concurrent indications of quantities of said circuits.

3. The combination with a single electro-responsive indicating means and a plurality of circuits, of means for changing said indicating means from circuit to circuit and simultaneously changing the resistance between said indicating means and said circuits and for causing the indicating means to effect apparently concurrent indications of quantities of said circuits.

4. The combination with means for passing a beam of energy along a predetermined path, of means for vibrating said beam of energy in accordance with a varying electrical quantity, and means for making said vibrating beam of energy appear as a plurality of waves.

5. The combination with a single electro-responsive indicating means and a plurality of circuits, of means for changing said indicating means from circuit to circuit and simultaneously adjusting said indicating means to the several circuits and for causing the indicating means to effect apparently concurrent indications of quantities of said circuits in superimposed relation.

6. In combination with a single deflecting element and a polygon of viewing mirrors, means including a commutator for switching said element from one circuit to another at a rate at least equal to the persistency of human vision.

7. In combination with a single galvanometer-deflecting element and a polygon of viewing mirrors, means including a commutator mounted on the axis of said polygon of viewing mirrors for switching said element from one circuit to another at a rate at least equal to the persistency of human vision.

8. In the art of obtaining plural indications from a single galvanometer deflecting system, the step which consists in apparently simultaneously producing upon a viewing surface a plurality of curves generated by light beams emanating from said deflecting system.

9. In the art of obtaining plural indications from a single galvanometer deflecting system, the step which consists in apparently simultaneously producing upon a viewing surface and in superposed relation a plurality of curves generated by light beams emanating from said deflecting system.

10. The method of operating apparatus including a deflecting element and a viewing means which comprises switching said element from one circuit to another at a speed at least as great as the persistency of human vision.

11. In combination, a light-reflecting galvanometer element, a tubular light-shield through which light from the element is reflected and which has one end disposed adjacent to the element, and a source of light disposed outside the tubular shield farther from the element than the adjacent end of the shield.

12. The combination with a casing having a partition dividing the same into upper and lower compartments, of a galvanometer including a light-reflecting element in the lower compartment, light-reflecting means disposed adjacent to an opening in said partition, a tubular light shield for directing reflected light from a position adjacent to said element through said opening and said light reflecting means, and a lamp disposed outside said shield above the lower end thereof.

13. In combination, a substantially rectangular casing, a light-transmitting galvanometer element disposed adjacent to the lower rear-end portion therein, a light-transmitting opening in the upper front wall of the casing and a prism adjacent to the upper rear portion in the casing for directing a light beam from the element to the opening, the top and rear walls of the casing being integrally connected.

14. In combination, a substantially rectangular casing, a light-transmitting galvanometer element disposed adjacent to the lower rear-end portion therein, a light-transmitting opening in the upper front wall of the casing and a prism adjacent to the upper rear portion in the casing for directing a light beam from the element to the opening, the top and rear walls of the casing being formed of a single sheet member.

15. In combination, a substantially rectangular casing, a light-transmitting galvanometer element disposed adjacent to the lower rear-end portion therein, a light-transmitting opening in the upper front wall of the casing and a prism adjacent to the upper rear portion in the casing for directing a light beam from the element to the opening, the top and rear walls of the casing being formed of a single sheet member having a curved portion between the intersecting top and rear-wall portions.

16. A system comprising means for passing a beam of energy along a predetermined path, a viewing means, means including a single galvanometer-deflecting element for reflecting said beam to said viewing means and for vibrating it in accordance with a varying electrical quantity, and means for making the vibrations of said beam appear in said viewing means as a plurality of curves.

17. A system comprising a plurality of circuits, means for passing a beam of energy along a predetermined path, a viewing means, means including a single galvanometer-deflecting element for reflecting said beam to said viewing means and for vibrating it in accordance with a varying electrical quantity, and means for switching said element from one of said circuits to another of said circuits at a rate at least equal to the persistency of human vision.

18. A system comprising a plurality of circuits, means for passing a beam of energy along a predetermined path, a polygon of viewing mirrors, means including a single galvanometer-deflecting element for reflecting said beam to said viewing mirrors and for vibrating it in accordance with a varying electrical quantity, and means for switching said element from one of said circuits to another of said circuits at a rate at least equal to the persistency of human vision.

19. In combination, a straight-line source of light for supplying a band of light, means including a galvanometer-deflecting element for vibrating said band of light in accordance with the variations of an electrical quantity, the axis of vibration of said galvanometer element and the axis of said straight-line source being in the same plane, a reflecting surface positioned in the path of said band of light substantially perpendicular to the plane of said band of light, an indicating surface in the path of said reflected band, and a cylindrical condensing lens positioned between said indicating surface and said reflecting surface.

In testimony whereof, I have hereunto subscribed my name this 7th day of September, 1928.

JOSEPH W. LEGG.